United States Patent [19]

Foster, deceased et al.

[11] Patent Number: 5,213,602
[45] Date of Patent: May 25, 1993

[54] ALIGNMENT APPARATUS

[75] Inventors: Thomas V. Foster, deceased, late of Skegness, by Mildred Foster, executor; Lancelot H. Miller, Sunderland; David Braithwaite, Washington, all of England

[73] Assignee: VHC, Ltd., West Palm Beach, Fla.

[21] Appl. No.: 769,924

[22] Filed: Sep. 30, 1991

[30] Foreign Application Priority Data

Oct. 10, 1990 [GB] United Kingdom ................. 9021983

[51] Int. Cl.5 ............................................... C03B 7/16
[52] U.S. Cl. ......................................... 65/304; 65/225
[58] Field of Search ........................ 65/225, 303, 304; 193/22

[56] References Cited

U.S. PATENT DOCUMENTS 1,911,119  5/1933  Ingle ..................................... 65/225
3,341,315  9/1967  Patschorke ........................... 65/304

Primary Examiner—Joye L. Woodard
Attorney, Agent, or Firm—Woodard, Emhardt, Naughton, Moriarty & McNett

[57] ABSTRACT

An improved gob guide apparatus for a glass bottle molding machine having interconnected gob guiding parts including a trough and a deflector adapted for mounting on a machine frame. The trough is pivotably secured to the frame and interconnected to the deflector at its lower end by a carriage supporting the deflector and permitting arcuate movement of the trough in response to movement of the carriage. The apparatus permits rapid alignment of the deflector with the mouth of a blank mold of a glass bottle molding machine.

12 Claims, 1 Drawing Sheet

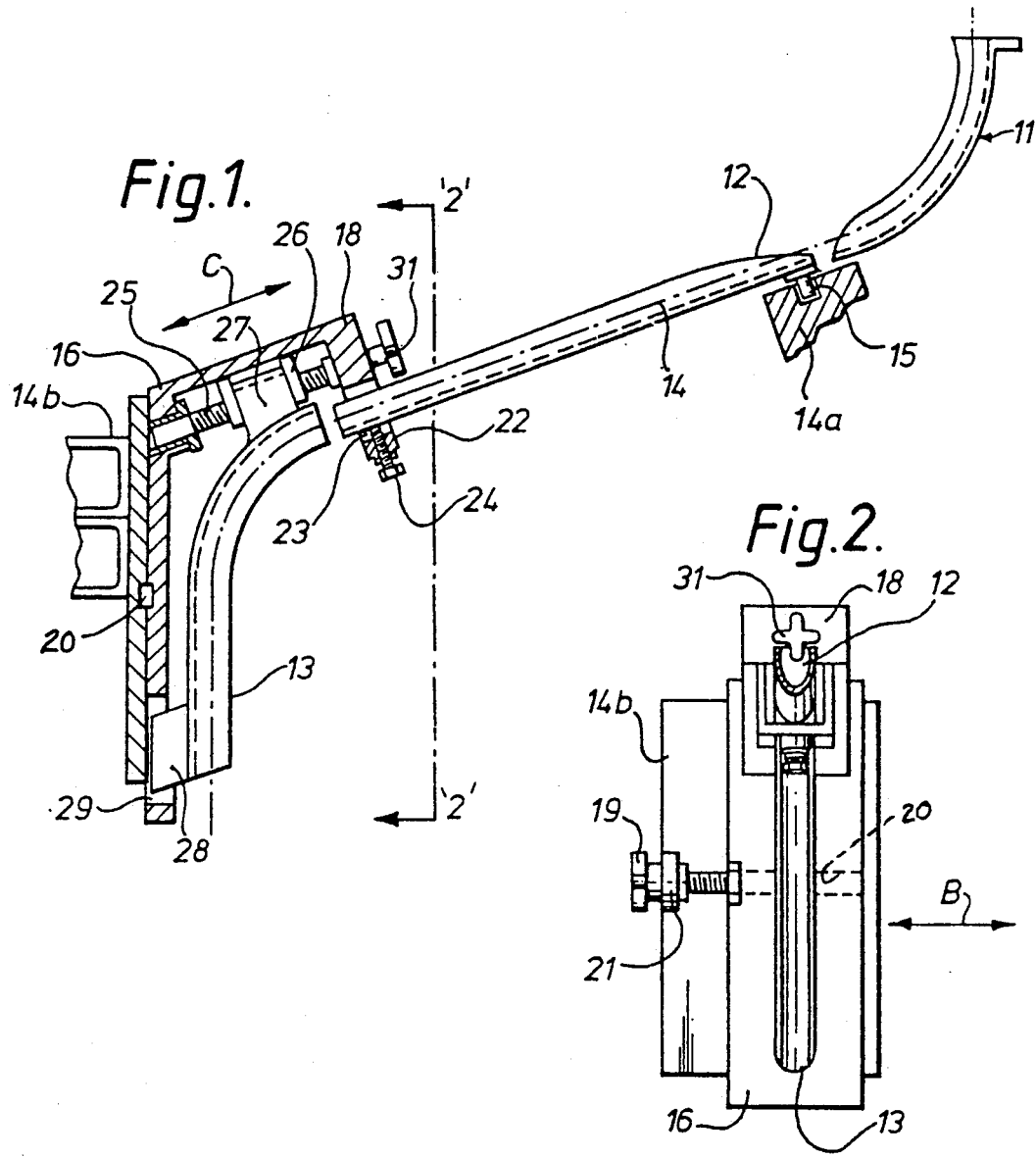
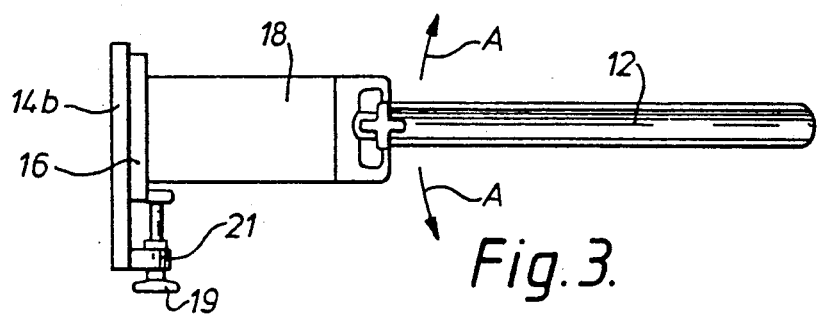

ALIGNMENT APPARATUS

BACKGROUND OF THE INVENTION

1. Field of the Invention

This invention relates to apparatus for ensuring consistent and accurate delivery of gobs of molten glass to the blank mould of a glass bottle moulding machine.

Glass bottle moulding machines usually include a plurality of moulds above which is placed a reservoir of molten glass. Glass passes from the reservoir in a slow stream and is sheared into gobs for sequential direction to the bottle moulds.

Typically a gob distributor just below the shears directs a gob into the guide trough of a respective mould, the gob sliding under gravity and being deflected to fall vertically into the blank mould.

The gob distributor adopts an alternative position for the subsequent gob and the timing of the machine is arranged to deliver gobs of glass to each mould in regular sequence. Hitherto the method of aligning the gob guide trough and deflector has been relatively crude thus leading to imprecise guidance of the gob and the possibility of nonvertical entry into the blank mould.

Typically each part of the apparatus for guiding the gob from distributor to mould is separately mounted on the machine frame; the position of each part is separately adjustable in three dimensions to permit accurate alignment of adjacent parts. In practice alignment is often time consuming since adjustment of the position of one part of the apparatus affects the position of adjacent parts. The method and means for aligning the gob delivery apparatus have remained largely unchanged for many years.

SUMMARY OF THE INVENTION

The present invention provides an improved gob guide apparatus having interconnected gob guiding parts.

According to the invention there is providing gob guide apparatus for a glass bottle moulding machine, said apparatus including a trough and a deflector adapted for mounting on a machine frame having means to adjust the position of said trough and deflector relative thereto, said apparatus comprising:

a carriage adapted for mounting on said frame and movable along a transverse axis thereof, a deflector having an entry axis and an exit axis, and a trough;

said deflector being mounted on said carriage for movement relative thereto along said entry axis, said exit axis being substantially perpendicular to said transverse axis;

said deflector further including support means for one end of said trough, said support means permitting relative movement of said trough along said entry axis; the other end of said trough having pivot means adapted to be secured to said frame, said pivot means permitting arcuate movement of said trough in response to movement of said carriage along said transverse axis.

Such apparatus permits rapid alignment of the deflector with the mould mouth, the carriage moving the deflector along one axis and the deflector itself being movable relative to the carriage along another axis. By virtue of its pivotal mounting at the entry end, the trough swings angularly to accommodate transverse carriage movement. Once the trough exit and deflector inlet are aligned no further adjustment of position between these parts is necessary, the support means for the trough exit end permitting relative movement of the trough along the entry axis of the deflector, and slight angular movement of the trough about its pivot.

The carriage may further include means to adjust the exit axis of the trough relative to the entry axis of the deflector; however, as noted above, further adjustment is not required for subsequent re-positioning of the deflector exit.

In a preferred embodiment the position of the carriage relative to the machine frame, and the position of the deflector relative to the carriage is determined by respective screw threaded adjusters. Preferably the deflector is supported on a nut of the respective adjuster.

The apparatus may further include guide means to maintain the exit axis of the deflector perpendicular to said transverse axis. The guide means may comprise a slot of the machine frame and one or more guide members attached to said deflector and slidable in said slot.

The pivot means for said trough may comprise a pin depending from the underside thereof and engageable in a close fitting recess of the machine frame, the axis of the pin being on the major axis of the trough and substantially perpendicular to a line drawn between the gob distributor exit and the deflector inlet.

Other features of the invention will be apparent from the following description of a preferred embodiment shown by way of example only in the accompanying drawings in which:

BRIEF DESCRIPTION OF THE DRAWINGS

FIG. 1 is a part-sectional elevation of gob delivery apparatus according to the invention;

FIG. 2 is a sectional view through the apparatus of FIG. 1 on line 2—2 and in the direction indicated; and FIG. 3 is a partial plan of the apparatus of FIG. 1.

DESCRIPTION OF THE PREFERRED EMBODIMENT

The drawings show gob guide apparatus including a scoop 11, trough 12 and deflector 13 each comprising an open steel channel. The gob passes through the apparatus under the force of gravity, the gob centre line being indicated by the chain-dot line 14.

The scoop 11 is conventional and may form part of a servo-driven gob distributor of any suitable kind.

The trough 12 is of any suitable length to suit the distance between the gob distributor and the blank mould, the angles of the scoop and deflector being dependent on the length of the trough and the vertical distance between the gob distributor and mould mouth.

The entry end of the trough 12 has a depending pivot pin 15 fixed to the underside thereof and located in a close fitting recess of the machine frame 14a as shown. The frame 14a provides support for the trough and permits limited angular thereof about the axis of pivot pin 15, as indicated by arrows 'A' of FIG. 3.

A carriage 16 mounted on the machine frame 14b for transverse movement (indicated by arrow B) includes an arm 18 extending in a direction substantially parallel to the axis of the trough 12.

The carriage 16 may be mounted by any suitable means, for example rods or slide ways 20, and its position relative to the machine frame is altered by means of an adjuster 19 screw threaded in a boss 21 of the frame.

A depending projection 22 of the arm 18 includes an aperture 23 to receive the exit end of the trough 12; the projection has an adjuster screw 24 threaded therein and in abutment with the underside of the trough thereby to adjust the relative vertical position thereof. The lateral position of the trough 12 within the aperture 23 is fixed by suitable means (not shown) which allow slight relative angular movement therebetween to accommodate lateral movement of the carriage 16 relative to the frame 14b.

The carriage incorporates a threaded rod 25 journalled therein as shown, the axis of the rod being substantially parallel to the arm 18 and vertically above the axis of the trough 12. Threaded on the rod 25 is a nut 26 having a shoulder at each end and on which is journalled a bracket 27 attached to the deflector 13. The deflector includes a fin 28 adjacent the exit thereof and slidable in a slot 29 of the machine frame; co-operation between the fin and slot ensures that the exit direction from the deflector is vertical, the slot however permitting relative vertical and transverse movement of the fin as will be clear from the drawings.

Rotation of the rod 25 by means of hand wheel 31 causes the deflector to move along the trough axis in a direction generally indicated by arrow C.

Use of the apparatus is as follows. The exit from trough 12 and entry to deflector 13 are aligned by use of adjuster screw 24. The exit from deflector 13 and the mould are aligned using adjuster 19 and threaded rod 25, the arrangement ensuring that any movement of deflector 13 results in compensating movement of trough 12 where necessary. Accordingly the gob delivery path may be quickly and accurately aligned with the bottle mould without time consuming adjustments to all parts of the gob delivery apparatus.

Once aligned, the position of the trough and deflector should not require re-adjustment for subsequent movements of the deflector with respect of the mould mouth.

We claim:

1. Gob guide apparatus for a glass bottle moulding machine having a machine frame, comprising:
   a machine frame; and
   a gob guide apparatus, said apparatus having
      a trough having upper and lower ends,
      a deflector having an entry and an exit axis,
      a carriage, and
      frame mounting means for movably mounting said carriage on said machine frame and movable along an axis transverse to said deflector exis axis, said carriage further including deflector mounting means for mounting said deflector on said carriage for movement relative thereto along said deflector entry axis,
      said carriage further including support means for supporting said lower end of said trough in an aligned orientation with respect to said deflector entry axis,
      said upper end of said trough and said machine frame having pivot means for permitting arcuate movement of said trough in response to movement of said carriage along said transverse axis.

2. Apparatus according to claim 1 wherein said trough has an exit axis at said lower end and said trough support means on said carriage further includes means for vertically adjusting the exit axis of the trough relative to the entry axis of the deflector.

3. Apparatus according to claim 2 wherein said deflector mounting means includes a first screw threaded adjuster supporting said deflector and extending substantially parallel to the trough for adjusting the distance between the deflector and the lower end of the trough and wherein said frame mounting means includes a second screw threaded adjuster mounted to said machine frame and adjustable to adjust the position of the carriage along said transverse axis relative to the machine frame.

4. Apparatus according to claim 2 wherein said apparatus further comprises in combination:
   a guide means for maintaining the exit axis of the deflector perpendicular to said transverse axis.

5. Apparatus according to claim 2 wherein said pivot means for said trough comprises a pin depending from the underside thereof and a close fitting recess in the machine frame receiving said pin, said pin being oriented substantially perpendicular to the entry axis of said deflector.

6. Apparatus according to claim 1 wherein said deflector mounting means includes a first screw threaded adjuster supporting said deflector and extending substantially parallel to the exit axis of the trough for adjusting the distance between the deflector and the lower end of the trough and wherein said frame mounting means includes a second screw threaded adjuster mounted to said machine frame and adjustable to adjust the position of the carriage along said transverse axis relative to the machine frame.

7. Apparatus according to claim 6 wherein said apparatus further comprises in combination:
   a guide means for maintaining the exit axis of the deflector perpendicular to said transverse axis.

8. Apparatus according to claim 6 wherein said pivot means for said trough comprises a pin depending from the underside thereof and a close fitting recess in the machine frame receiving said pin, said pin being oriented substantially perpendicular to the entry axis of said deflector.

9. Apparatus according to claim 1 wherein said apparatus further comprises in combination:
   a guide means for maintaining the exit axis of the deflector perpendicular to said transverse axis.

10. Apparatus according to claim 9 wherein said guide means comprises a slot in the carriage and one or more guide members attached to said deflector and slidable in said slot.

11. Apparatus according to claim 9 wherein said pivot means for said trough comprises a pin depending from the underside thereof and a close fitting recess in the machine frame receiving said pin, said pin being oriented substantially perpendicular to the entry axis of said deflector.

12. Apparatus according to claim 1 wherein said pivot means for said trough comprises a pin depending from the underside thereof and a close fitting recess in the machine frame receiving said pin, said pin being oriented substantially perpendicular to the entry axis of said deflector.

* * * * *